United States Patent Office 3,290,264
Patented Dec. 6, 1966

3,290,264
IMPROVED COATING COMPOSITIONS CONTAINING AS A LEVELING AGENT AN ORGANO PHOSPHITE COMPOSITION
Charles F. Baranauckas, Niagara Falls, and James J. Hodan, Tonawanda, N.Y., assignors to Hooker Chemical Corporation, Niagara Falls, N.Y., a corporation of New York
No Drawing. Filed Aug. 16, 1963, Ser. No. 302,711
10 Claims. (Cl. 260—28.5)

This invention relates to improved wax modifying agents and more particularly to improved leveling agents for wax polish compositions. This application is a continuation-in-part of application Serial Number 47,362 filed August 4, 1960, now United States Patent 3,101,363, wherein both the process for making a preferred leveling agent and its use in wax polish compositions is disclosed.

Emulsion polishes are also sometimes referred to as high resin formulas or polymer type formulas. These formulas contain as a principal ingredient a polymer emulsion, such as an emulsion of modified polystyrene, a modified polyacrylic, a blend of the two, or a complex styrene acrylic copolymer. The balance of the polish usually comprises a synthetic waxy polymer, such as polyethylene or polypropylene, an ammonia soluble resin, an emulsifying agent, a leveling agent and a diluent comprising water and a basic component such as ammonia or organic amine.

Suitable polishes are also prepared when the polymer emulsion is omitted. Natural waxes, such as carnauba wax and ammonia soluble resins such as shellac, casein, or a high melting thermoplastic polyester type resin have successfully constituted the entire polish base of liquid polishes. Those liquid polishes also contain emulsifying agent, leveling agent, and a diluent comprising water and a basic component such as ammonia or organic amine.

Heretofore only the phosphate type of organo phosphorous compounds was considered useful as leveling agents in polish formulations. The phosphite type compounds were acknowledged to be unstable and therefore useful as antioxidants and the like. This instability in polish compositions caused the composition to undergo phase separation with the result that such compositions were no longer suitable for intended uses.

It is an object of this invention to provide organo phosphite compounds useful as leveling agents for wax polish compositions. A further object of this invention is to provide improved wax emulsion compositions with superior leveling properties. Yet another object of this invention is to provide wax emulsion compositions with improved gloss properties. These and other objects and advantages will become apparent upon inspection of this specification.

In accordance with this invention there are provided superior leveling agents suitable for use in wax polish compositions which comprise organophosphite compounds of the formula

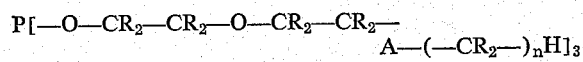

wherein each R is independently selected from the group consisting of H and lower alkyl, A is selected from the group consisting of O and $CR_2$, $n$ is an integer from 1 to 5. Preferably when R is lower alkyl, R will contain 1 to 3 carbon atoms. Generally at least about 50 percent of the R groups in the molecule are hydrogen. Frequently, the number of alkyl substituents in the molecule does not exceed about nine.

Illustrative of the above defined class of phosphite compounds suitable for leveling agents are:

tris(2-butoxyethyl)phosphite
tris(2-isobutoxyethyl)phosphite
tris(2-hexoxyethyl)phosphite
tris(1-butoxyethyoxy-2-propyl)phosphite
tris(2-propoxyethyl)phosphite
tris(2-butoxyisopropyl)phosphite
tris(2-isopentoxyisopentyl)phosphite
tris(1-isopentoxyisopropoxy-2-butyl)phosphite
tris(1-isopropoxyisopentoxy-2-pentyl)phosphite
tris(1-isopropoxyisobutoxyethyl)phosphite Mixed phosphites, e.g., 2-dipropoxyethyl-2-butoxyethyl phosphite; 2-propoxyethyl-2-butoxyethyl-2-isobutoxyethyl phosphite; dibutoxyethylisobutoxyethyl phosphite and others in which different organic moieties, like those listed above, are on the phosphorous.

The organo phosphites of this invention are added to the polish composition in amounts desired to achieve the leveling and gloss required. Generally, the amount of organo phosphite added will be between about 4 percent and about 12 percent of the total solids of polish base, usually the polymer, wax and resin present in the polish composition. However, depending on the exact properties desired, more or less than the above amounts of phosphites may be incorporated into the polish composition and from 1 to 25 percent of use in some products. Especially desirable balancing of properties is obtained when the organo phosphite is added in an amount between about 6 percent and about 10.5 percent of the polish base total solids. The total solids content of the polish base may be from about 2 to 50 percent in some instances but generally ranges from about 6 to about 25 percent by weight of the final polish composition, while the preferred range is from about 9 to about 18 percent. When a polymer such as polystyrene is present in the polish composition, a further balancing of desirable properties can be obtained by the use of a small amount of a phthalate plasticizer, such as dibutylphthalate, along with the phosphite leveling agent of this invention.

The ammonia soluble resins may constitute from about 10 to about 70 percent by weight of the total solids of the base polish, the balance being wax or wax and polymer derived from ethylenically unsaturated monomers such as polystyrene, the amount of polymer generally being in excess with respect to the amount of wax present.

The final polish composition is normally prepared by making a water solution of the resin portion, a water emulsion of the wax portion and a water emulsion of the polymer portion, separately, and then mixing them together to provide the final composition. When wax and resin comprise the polish, it may be more convenient to prepare a single solution directly rather than to prepare separate solutions and blend them together. The leveling agents of this invention may be incorporated into the polymer component or directly added to the final blend of resin, wax and polymer with agitation, as desired. In order to improve storage stability, the polish composition is usually of a pH of at least 7 and more usually of a pH from about 7.5 to about 10. If necessary it may be adjusted to this pH by use of a suitable acidifying agent.

The term "soluble" as employed in this specification is intended to denote material dispersible in the solvent, as well as material completely or partially dissolved in the solvent.

A solution of ammonia soluble resin is readily prepared for use in a polish emulsion system. In a typical preparation, 100 parts of an ammonia soluble resin and 500 parts of water are charged to a vessel which will not permit loss of volatile materials. While agitating the mixture in the vessel, about 25 parts of a 28 percent ammonium hydroxide solution is added to the vessel and agitation is continued until the solution of the resin is complete. Gentle heating may be employed to speed the solubilization. In the preparation of the resin solution, the ammonia may be replaced in whole or in part by other alkaline materials such as volatile organic amines. Suitable volatile organic amines include the aliphatic and hydroxy aliphatic amines having boiling points below about 200 degrees centigrade at a pressure of 760 millimeters of mercury, for example, morpholine, ethoxypropylamine, 2-amino-2-methyl-1-propanol ethanolamine, dimethylolamine, ethylene diamine and triethylolamine. The resin solutions generally contain from about 5 to 25 percent solids, preferably about 15 to 20 percent solids.

A typical polyethylene wax emulsion is prepared by melting, at a temperature not exceeding 270 degrees Fahrenheit, 13.9 parts of AC polyethylene 629, a well known low molecular weight polyethylene wax, melting point—213–221 degrees Fahrenheit, manufactured by Allied Chemical Corporation, New York, N.Y. To the melted wax, 2.1 parts of oleic acid are added with agitation and the mixture is reheated to 230 degrees Fahrenheit and agitated until it is uniformly fluid whereupon 24 parts of morpholine are added. The resulting mixture is reheated to 250 degrees Fahrenheit and agitation is continued until a uniform blend is produced. To the resulting mixture are added 81.5 parts of water at just below 212 degrees Fahrenheit and the emulsion is quickly cooled to room temperature, with agitation. In a similar manner emulsions of natural waxes such as carnauba, candelilla, oxidized micro crystalline or ouricuri and synthetic waxes such as polypropylene can be prepared.

The polymer emulsion of latex, as heretofore noted, may contain polystyrene, polyvinyl chloride, or polyacrylic resins. Particularly suited to the polish compositions of this invention are those resins having a molecular weight of above 5000, preferably those having a molecular weight above 100,000. Generally, these emulsion polymers have molecular weights below 600,000. These aqueous emulsions are used to provide high gloss, durability and toughness.

A typical polymer emulsion is prepared by charging into an enclosed mixing vessel 34.9 parts of U–2003 Ubatol, a polystyrene product manufactured by the UBS Chemical Corporation, Cambridge, Mass. U–2003 Ubatol is a modified polystyrene emulsion of 40% total solids content, specific gravity at 25 degrees centigrade of 1.029, weighing 8.55 pounds per gallon, of pH of 9.3, infinitely dilutable with water, of unchanged freeze-thaw stability after repeated freezing and thawing cycles and of residual monomer content of less than 0.1%. The polymer is of molecular weight greater than 150,000, of average particle size less than 0.01 micron and the particles are negatively charged. With moderate agitation 11.5 parts of water is added to the vessel and mixing is continued until the mixture is uniform, whereupon a solution of about 2 parts of polish leveling agents and 51.6 parts of water is added to the vessel. Agitation is then continued for 20 minutes.

The practice of this invention is illustrated but not limited by the examples given below. Temperatures are expressed in degrees centigrade and all parts are by weight unless otherwise noted.

Example 1

A wax emulsion was prepared by charging 9.8 pounds of refined Number 3 North Country carnauba wax and 4.1 pounds of terpene phenolic, oil soluble, low viscosity thermoplastic (melt point about 133 degrees) resin to a kettle or reaction vessel. The wax and resin were heated to about 176 degrees and the mixture was agitated until uniform. Thereafter the mixture was cooled to 100 degrees and 2.2 pounds of oleic acid were added with agitation until the mix became uniform. Then 1.5 pounds of morpholine were added under the same conditions. Finally a solution of 0.7 pound ammonium hydroxide (28% $NH_3$) and 0.7 pound water was added with agitation until homogeneous and then the mix held for a few minutes. The resulting wax-resin-emulsifier base was then quickly added with rapid agitation to 81 pounds of boiling water and was quickly cooled to room temperature. The wax composition of pH 8.7 was then usable as a floor polish. It contained no phosphite.

Example 2

To 25 parts of the product of Example 1, at room temperature, was added 0.188 part (0.75 percent) of tris (butoxyethyl)phosphite with stirring. The pH was determined to be 8.7 and after standing 6 days the pH was still 8.7. A portion of the stabilized wax emulsion was applied to standard flat back wax test paper and was allowed to dry at room temperature. The leveling action was good and a uniform wax coating was obtained. The unused portion of wax emulsion remained completely emulsified after standing overnight. This indicates that the compositions have excellent stability on standing.

In a manner similar to Example 2, other emulsions were prepared with tris(2-butoxyethyl)phosphite and these results are tabulated below. In addition comparative products in which tris(ethoxyethyl)phosphite was employed were prepared.

| Example | Parts of Wax Example 1 | Phosphite | | | Coating on Wax Test Paper | Stability Standing Overnight |
| --- | --- | --- | --- | --- | --- | --- |
| | | Parts | Percent | Organo Portion | | |
| 2 | 25 | 0.188 | 0.75 | Tris(2-butoxyethyl) | Good | Emulsified. |
| 3 | 25 | 0.188 | 0.75 | Tris(ethyoxyethyl) | Fair | Emulsified. |
| 4 | 25 | -------- | None | -------- | Poor | Emulsified. |
| 5 | 25 | 0.33 | 1.3 | Tris(2-butoxyethyl) | Very good | Emulsified. |
| 6 | 25 | 0.43 | 1.7 | Tris(2-butoxyethyl) | Very Good | Slight Thickening. |
| 7 | 20 | 0.15 | 0.75 | Tris(1-butoxyethoxy-2-propyl). | Good | Emulsified. |
| 8 | 20 | 0.27 | 1.3 | Tris(1-butoxyethoxy-2-propyl). | Very Good | Emulsified. |
| 9 | 20 | 0.34 | 1.7 | Tris(1-butoxyethoxy-2-propyl). | Very Good | Emulsified. |
| 10 | 10 | 0.075 | 0.75 | Tris(2-hexoxyethyl) | Very Good | Emulsified. |
| 11 | 10 | 0.133 | 1.33 | Tris(2-hexoxyethyl) | Very Good | Emulsified. |
| 12 | 10 | 0.17 | 1.7 | Tris(2-hexoxyethyl) | Very Good | Emulsified. |

Comparable similar results are obtained when other phosphites of this invention such as tris(1-isopropoxyisopentoxy-2-pentyl)phosphite and tris(2-butoxyisopropyl) phosphite are employed in a similar manner.

The preparation of tris(1-butoxyethoxy-2-propyl) is shown in Example 13 and tris(2-hexoxyethyl)phosphite is shown in Example 14 below.

Example 13.—Preparation of tris (1-butoxyethoxy-2-propyl)phosphite

Triphenyl phosphite (309.4 grams, 1.0 mole), 1-butoxyethoxy-2-propanol (706.7 grams, 4.0 moles), and sodium (1.0 gram, 0.04 mole) were mixed in a 3-neck flask equipped with a heating mantle, magnetic stirrer, 6-inch Vigreux column, thermometer, and condenser. The mixture was heated to 100 degrees and maintained there for 1.5 hours. The pressure was then reduced to about 25 mm. and a mixture of phenol and 1-butoxyethoxy-2-propanol remained. The pressure was gradually reduced and heating was continued until a pot temperature of 167 degrees at 0.9 mm. of mercury pressure had been reached. A residual product of tris(1-butoxyethoxy-2-propyl)phosphite (600.9 grams) was collected.

*Example 14.—Preparation of tris(2-hexoxyethyl) phosphite*

Triphenyl phosphite (311.6 grams, 1.0 mole), 2-hexoxyethanol (584.6 grams, 4.0 moles) and sodium (1.5 grams, 0.06 mole) were stirred in a 3-neck flask equipped with a heating mantle, magnetic stirrer, 6-inch Vigreux column, thermometer, and condenser. The mixture was heated to 100 degrees and maintained there for 1.5 hours. The pressure was then reduced to about 25 mm. and a mixture of phenol and 2-hexoyethanol remained. The pressure was gradually reduced and heating continued until a pot temperature of 165 degrees at 0.4 mm. of mercury pressure had been reached. A residue product of tris(2 - hexoxyethyl)phosphite (465.4 grams) was collected.

*Example 15*

An emulsion polish formulation containing a synthetic wax was prepared by blending together in a suitable mixing vessel at room temperature:

| | Parts |
|---|---|
| Acrylic polymer emulsion (16 percent total solids) | 40 |
| Modified styrene polymer emulsion (16 percent total solids) | 40 |
| Ammonia soluble thermoplastic polyester resin solution (16 percent total solids | 10 |
| Polyethylene emulsion (16 percent total solids) | 10 |
| Polyethylene glycol dibenzoate (molecular weight approximately 808, melt point 3.8 degrees) | 0.5 |

The emulsion polish was stirred until uniform.

*Example 16*

To 10.0 parts of the emulsion polish of Example 15, at room temperature, was added with stirring 0.133 part of tris(2-butoxyethyl)phosphite. A portion of the stabilized wax emulsion was applied to standard flat black wax test paper and allowed to dry at room temperature. The leveling action was very good and a uniform coating was obtained.

In a manner similar to Example 16, other emulsion polishes were prepared and tested. The results are tabulated in the following table.

| Example | Parts of Emulsion Example 15 | Phosphite | | | Coating on Wax Test Paper | Stability After 24 Hours |
|---|---|---|---|---|---|---|
| | | Parts | Percent | Organo Portion | | |
| 16 | 10.0 | 0.133 | 1.33 | Tris(2-butoxyethyl) | Very Good | Emulsified. |
| 17 | 10.0 | 0.133 | 1.33 | Tris(1-butoxyethoxy-2-propyl). | Good | Emulsified. |
| 18 | 10.0 | 0.133 | 1.33 | Tris(2-hexoxyethyl) | Good | Emulsified. |

*Example 19*

In a manner similar to Example 15 an emulsion polish was prepared and comprised of the ingredients of Example 15 except that it contained no polyethylene glycol dibenzoate.

*Example 20*

To 10.0 parts of the emulsion polish of Example 19 at room temperature was added with stirring 0.133 part of tris(2-butoxyethyl)phosphite. A portion of the stabilized wax emulsion was applied to standard flat black wax test paper and allowed to dry at room temperature. The leveling action was good and a uniform coating was obtained.

In a manner similar to Example 20, other emulsion polishes were prepared and tested. The results are tabulated in the following table.

| Example | Parts of Emulsion Example 19 | Phosphite | | | Coating on Wax Test Paper | Stability After 24 Hours |
|---|---|---|---|---|---|---|
| | | Parts | Percent | Organo Portion | | |
| 20 | 10.0 | 0.133 | 1.33 | Tris(2-butoxyethyl) | Good | Emulsified. |
| 21 | 10.0 | 0.133 | 1.33 | Tris(1-butoxyethoxyethyl) | Good | Emulsified. |
| 22 | 10.0 | 0.133 | 1.33 | Tris(2-hexoxyethyl) | Good | Emulsified. |

Satisfactory results are obtained when the organo phosphites of this invention are employed in polish emulsion formulations of the types shown below.

High gloss acrylic emulsions such as:

| | Parts |
|---|---|
| Modified acrylic copolymer emulsion (15 percent total solids) | 72.5 |
| Ammonia soluble thermoplastic polyester resin solution (15 percent total solids) | 16.5 |
| Polyethylene emulsion (morpholine oleate stabilized) (15 percent total solids) | 11.0 |
| Diethylene glycol monoethyl ether | 1.5 |
| Nonylphenoxypolyethoxyethanol | 0.3 |
| An organo phosphite of this invention | 0.75 |

High gloss styrene emulsion polish such as:

| | Parts |
|---|---|
| Styrene polymer emulsion (15 percent total solids) | 45.0 |
| Ammonia soluble, very high acid number, thermoplastic polyester resin solution (15 percent total solids) | 30.0 |
| Polyethylene anionic wax emulsion (15 percent total solids) | 25.0 |
| 1-octanol | 0.2 |
| Diethylene glycol monoethyl ether | 0.1 |
| An organo phosphite of this invention | 0.1 |

The phosphites of this invention are also effective as stabilizing agents in wax compositions when the composition is based on synthetic wax as well as when the wax is naturally occurring. In all cases, the phosphites confer a beneficial stabilization which prior to this time was thought to be obtainable only by using a phosphate compound.

Various changes and modifications may be made in the method and apparatus of this invention and the amounts of the phosphites of this invention, certain pre-

What is claimed is:

1. A wax polishing composition comprising a wax and a levelling agent of the formula $$P[-O-CR_2-CR_2-O-CR_2-CR_2-A-(-CR_2-)_nH]_3$$

wherein each R is independently selected from the group consisting of H and lower alkyl containing 1 to 3 carbon atoms, A is selected from the group consisting of O and $CR_2$ and $n$ is an integer from 1 to 5, said composition having a pH of at least 7.

2. A wax polishing composition of pH from 7.5 to 10 and solids content of 6 to 25 percent by weight comprising an ammonia soluble resin selected from the group consisting of shellac, casein and high melting thermoplastic polyester, a polymer selected from the group consisting of polystyrene, polyvinyl chloride and polyacrylic resins of molecular weight above 100,000, emulsifier, water and a leveling agent of the formula $$P[-O-CR_2-CR_2-O-CR_2-CR_2-A-(-CR_2-)_nH]_3$$

wherein each R is indepenently selected from the group consisting of H and lower alkyl containing 1 to 3 carbon atoms, A is selected from the group consisting of O and $CR_2$, $n$ is from 1 to 5, the leveling agent being from about 4 to 12 percent of the solids content.

3. A coating composition comprising a wax, an ammonia soluble resin, emulsifier, water and a leveling agent having the formula $$P[-O-CR_2-CR_2-O-CR_2-CR_2-A-(-CR_2-)_nH]_3$$

wherein each R is independently selected from the group consisting of H and lower alkyl containing 1 to 3 carbon atoms; A is selected from the group consisting of O and $CR_2$; and $n$ is an integer from 1 to 5; said coating composition having a pH of at least 7.

4. A coating composition according to claim 3 wherein the leveling agent is tris(2-butoxyethyl)phospite.

5. A coating composition according to claim 3 wherein the leveling agent is tris(1 - butoxyethoxy - 2 - propyl) phosphite.

6. A coating composition according to claim 3 wherein the leveling agent is tris(2-hexoxyethyl)phospite.

7. A coating composition comprising a wax, an ammonia soluble resin, a polymer component wherein the polymer is derived from an unsaturated monomer, emulsifier, water and a leveling agent having the formula $$P[-O-CR_2-CR_2-O-CR_2-CR_2-A-(-CR_2-)_nH]_3$$

wherein each R is independently selected from the group consisting of H and lower alkyl containing 1 to 3 carbon atoms; A is selected from the group consisting of O and $CR_2$; and $n$ is an integer from 1 to 5; said coating composition having a pH of at least 7.

8. A coating composition according to claim 7 wherein the leveling agent is tris(2-butoxyethyl)phosphite.

9. A coating composition according to claim 7 wherein the leveling agent is tris(1-butoxyethoxy-2-propyl) phosphite.

10. A coating composition according to claim 7 wherein the leveling agent is tris(2-hexoxyethyl)phosphite.

References Cited by the Examiner

UNITED STATES PATENTS

| | | | |
|---|---|---|---|
| 2,695,277 | 11/1954 | Pabst et al. | 260—28.5 |
| 2,928,861 | 3/1960 | Short | 260—461 |
| 2,937,098 | 5/1960 | Geen | 106—10 |
| 2,957,905 | 10/1960 | Gaertner | 206—461.315 |
| 2,971,934 | 2/1961 | Brown et al. | 260—28.5 |
| 3,072,492 | 1/1963 | Smith et al. | 106—10 |
| 3,101,363 | 1/1963 | Baranauckas et al. | 260—461 |
| 3,115,465 | 12/1963 | Orloff et al. | 260—461.315 |

MORRIS LIEBMAN, *Primary Examiner.*

B. A. AMERNICK, *Assistant Examiner.*